United States Patent Office 3,301,633
Patented Jan. 31, 1967

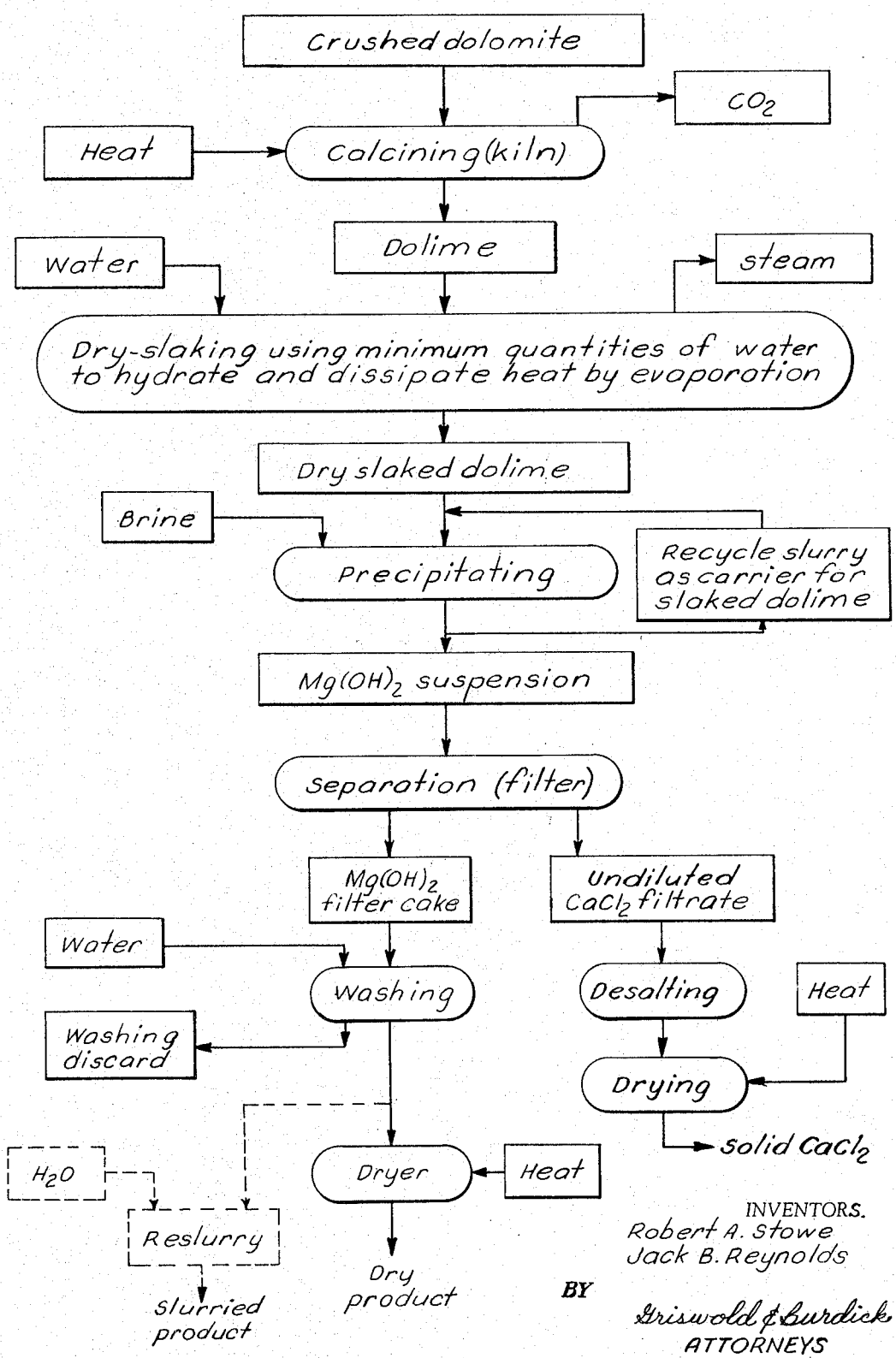

3,301,633
PROCESS FOR PRODUCTION OF MAGNESIUM HYDROXIDE AND CALCIUM CHLORIDE
Robert A. Stowe and Jack B. Reynolds, Ludington, Mich., assignors to The Dow Chemical Company, Midland, Mich., a corporation of Delaware
Filed Jan. 24, 1964, Ser. No. 340,023
7 Claims. (Cl. 23—90)

This invention relates to the production of magnesium hydroxide and calcium chloride and more particularly relates to an improved process for preparing magnesium hydroxide and calcium chloride from a brine containing magnesium chloride and a form of quick lime selected from the group consisting of calcined limestone and dolomite.

Magnesium hydroxide has long been produced from magnesium chloride-containing brines by various processes employing dolomitic stones and limestones. For convenience, the term "dolomite" as used hereinafter refers to limestones containing calcium carbonate and magnesium carbonate in varying molar ratios and primarily to high purity dolomite stone, as found for example in Michigan, U.S.A., which is a substantially equimolar mixture of both carbonates. Dolomitic stone is particularly useful in said processes inasmuch as the magnesium values in the dolomite are converted to magnesium hydroxide product along with the magnesium values in the brine being processed.

Reference to brine in this specification, while in general including aqueous solutions of the alkali metal and alkaline earth halide salts including magnesium chloride, more specifically means both natural and synthetic brines which contain at least about 15 weight percent of the chlorides of magnesium and calcium, but not normally exceeding about 45 percent, and at least about 2 percent magnesium chloride, the balance being essentially water and other halide salts of the alkali metals and alkaline earths.

One method of those various precesses referred to hereinbefore, disclosed in U.S. Patent 3,080,215 and comprises in general, calcining dolomite to convert it by heat into the oxides of calcium and magnesium, referred to hereinafter as dolime, slaking the dolime at particularly critical temperatures and for particular times with a 1.07 to 1.15 specific gravity aqueous calcium chloride slaking solution to form a slaked (hydrated) dolime slurry, or, alternatively slaking with an aqueous calcium chloride solution of up to a 1.3 specific gravity, provided the dolime is pulverized, and reacting the so-slaked dolime in a reactor with a brine containing magnesium chloride, thereby to form a slurried precipitate of magnesium hydroxide in a mother liquor of aqueous calcium chloride. This calcium chloride derives both from its presence originally in the brine as well as its formation during the process from the dolime or lime. The precipitate so-produced is then separated, as by filtration, from the mother liquor, washed, and stored, or, used immediately in a reslurried form. The calcium chloride may be recovered from the mother liquor as by drying to a solid product.

Though the above patented process in general produces satisfactory results, it possesses various disadvantages. For example, in slaking as aforesaid only a 1.07 to 1.15 specific gravity calcium chloride slaking solution may be used with unpulverized dolime, whereas, the dolime must be pulverized to fine particles in order to use calcium chloride solutions having gravities above 1.15 for slaking. The 1.07 to 1.15 specific gravity slaking requirement is particularly disadvantageous when using concentrated inland brines, for example, brines containing in excess of about 15 percent of the chloride of magnesium and calcium as it necessitates a diluting effect on the calcium chloride mother liquor in the precipitator. This requires more liquor to be processed through the system and more heat energy to evaporate the solution, after removal of the magnesium hydroxide therefrom, to recover by drying the $CaCl_2$ (calcium chloride) content. Alternatively, if dilution is not employed, the dolime particles must be pulverized, thus requiring an additional process step. A further disadvantage is that critical slaking temperatures and times must be employed in order to avoid the formation of calcium oxychloride and the attendant difficulties which are well known in the art.

Furthermore, another disadvantage in the patented process as described above in the case when dolime or lime is pulverized and then slaked with an undiluted calcium chloride slaking solution, the slaking solution and hence the precipitator contents absorb the heat of hydration thus causing an intolerable increase of the temperature therein, This is particularly so when employing brines containing a high percentage of magnesium chloride, as, for example, 9 percent or more of magnesium chloride in a system wherein precipitator slurry is recycled to the slaker for slaking purposes. Thus, upon recycling the increased temperature liquids from the precipitator to the slaker an undesirable formation of large lumps of the aforesaid calcium oxychloride results. Accordingly, a number of heat exchangers are required in such processes to dissipate and reject much of this heat, thereby increasing both process and equipment costs, including maintenance. In addition, when slaking dolime with the aforesaid dilute calcium chloride slaking solution, the reactivity and hydration rate of CaO in the dolime or lime is relatively slow as compared to that in the process of the present invention and tends to cause an inefficient, lengthy, and thus a more costly, precipitating procedure.

The object of the present invention therefore is to provide a novel and improved process for the production of periclase grade magnesium hydroxide without the attending aforesaid disadvantages.

Another object of this invention is to provide a process for production of fast filtering magnesium hydroxide from calcined dolomite, or lime, and a brine containing magnesium chloride which neither requires in the slaking thereof the use of pulverized dolime, or lime, nor dilution of precipitator slurry in order to be used as the slaking solution and which provides essentially complet recovery of the magnesium value of the brine.

A further object of the present invention is to provide a process wherein particularly critical slaking temperatures and times are obviated.

A still further object is to provide such a process wherein an undiluted aqueous calcium chloride effluent essentially free of magnesium chloride is generated suitable for subsequent processing to recover solid calcium chloride therefrom.

An additional object of the invention is to provide an improved method of producing magnesium hydroxide having in combination a novel precipitation and slaking procedure, whereby the need heretofore for heat exchangers, relative to slaking and precipitating is eliminated when brines having high magnesium chloride salt contents are employed.

A yet further object is to provide a process for producing magnesium hydroxide from limestone, and brines containing magnesium chloride, wherein the rate of CaO availability and reactivity in the precipitating procedure is greater than heretofore obtained and wherein due to the lack of pulverizing the unburned particles and siliceous portions of the lime may be separated as, for example, by screening following the slaking operation.

The above and other objects and advantages will become apparent when the following detailed description of the present invention is read in conjunction with the appended flow diagram which depicts one embodiment of the process of the invention.

It has now been found that the above objects and advantages can be obtained, and the disadvantages heretofore suffered in prior lime and dolomitic-brine processes obviated, by an improved process having a novel precipitating and slaking procedure, one embodiment of which is illustrated in the appended diagram, wherein a calcined dolomite, for example, is exposed to an amount of water in a slaker just sufficient both to hydrate the CaO portion of said dolime to $Ca(OH)_2$ and to remove at least a substantial portion of the heat of reaction by evaporation as steam during the slaking operation as the dolime or lime particles conveniently break down to a powdery consistency. Dolime may ordinarily be produced in a sufficiently porous and active condition previous to its slaking by calcining dolomitic stone in, for example, a rotary kiln at a temperature of from 1150° to 1450° C., and preferably 1300° to 1450° C., wherein the carbon dioxide is driven off by heat to form oxides of calcium and magnesium, the resulting mixture of said oxides, as heretofore explained, being commonly referred to as dolime. So-slaked, the dolime is then reacted by simultaneous addition to a reactor with a magnesium chloride-containing brine thereby to form a slurry of magnesium hydroxide in an aqueous calcium chloride mother liquor, the dolime conveniently being carried, after slaking, into the reactor by means of recycle, undiluted, precipitator slurry at a rate, in conjunction with the introduction of brine, sufficient not only to maintain a uniform inventory of liquid in the reactor but also to maintain a soluble alkalinity, as defined below, such that a slight excess of hydroxyl ion is maintained in the reactor at all times corresponding to a soluble alkalinity of from about 4 to about 30 mls. The so-formed magnesium hydroxide precipitate is then separated from the mother liquor in a separator, as for example, by filtration and washed, followed, if desired, by reslurrying the so-separated precipitate to a creamy consistency for transporting purposes to a utilization means, or, as an optional alternative, drying the washed precipitate for storage and subsequent use.

The term "soluble alkalinity" as used herein refers to the number of milliliters of 0.1 N HCl required to titrate a 100 ml. sample of the precipitator slurry filtrate to a phenolphthalein end point.

In accordance with the present invention, the water for slaking may be admixed with the dolime as, for example, by spraying into a revolving cylinder containing the dolime to be hydrated, the amount of water required and introduced, for example, into said cylinder being within the range of from about 0.4 pounds to about 1.5 pounds of water per pound of calcium oxide in the dolime, and preferably within the range of from about 0.55 pound to about 0.95 pound of water per pound of CaO. Inasmuch as a portion of the above specified amount of water employed for slaking will be evaporated thereby to dissipate substantially the heat of reaction, primarily during slaking, no heat exchangers will be required in slaking by the present invention as were heretofore required in slaking as described with respect particularly to the aforesaid patented process.

Inventory time of material in the slaker is not critical in the process of the present invention and need only be a length of time necessary to effect an essentially complete hydration of the lime or CaO portion of the dolime to $Ca(OH)_2$ without significant hydration of MgO to $Mg(OH)_2$ and to effect steam evolution. Such slaking time to provide substantially complete hydration of the CaO normally will not exceed, for example, over about 60 minutes and may, in a continuous process, be as short as to 2 to 5 minutes.

So-slaked, the dolime or lime hydrate by suitable means is then transported and introduced into a precipitator reactor. As indicated on the appended flow diagram, a particularly convenient way of transporting and introducing the slaked dolime to the reactor is by mixing said slaked dolime with a portion of the effluent slurry from the precipitator. Inasmuch as the dolime or lime has already been slaked by the procedure of the present invention, the precipitator slurry effluent need not be diluted and thus no excess water evaporated when said effluent filtrate is processed to recover $CaCl_2$ therefrom. This stream acts as an inert carrier for the slaked material from the slaker to the reactor, the flow of the stream in total, both out of and into the reactor, being regulated in conjunction with the addition of slaked dolime and brine so, as aforesaid, to maintain not only a constant inventory in said reactor, but also a slight excess of hydroxyl ion therein. It is manifest that different soluble alkalinity levels as a measure of the slight excess of hydroxyl ion in the reactor may have to be maintained depending on the compposition of the various brines, with respect primarily to the calcium and magnesium chloride content of the brine intended to be used in the present process and also with respect to the boron content in the brine. Thus, for brines containing about 23 to 27 percent calcium plus magnesium chloride, a 20 to 30 soluble alkalinity would be preferred when about 90 p.p.m. boron is present and about 4 to 12 soluble alkalinity when 30 p.p.m. or less boron is present.

Average inventory time of reactants in the precipitator vessel should be within the range of from about 2 to about 24 hours, preferably from 6 to 15 hours, the temperature in the reactor being maintained preferably within the range of from 50° to 65° C. Normally, the contents of the reactor are constantly stirred during precipitation, for example, by a turbine agitator, at a speed sufficiently high to keep said contents of the precipitator well mixed. Due to the chemical nature of the so-slaked lime, the calcium oxide value has a greater rate of availability and hence the lime is more completely utilized during the above inventory period.

During precipitation of the magnesium values in the brine as magnesium hydroxide, much of the unslaked magnesium oxide of the dolime feed is also hydrated to magnesium hydroxide, thus increasing the yield of product accordingly. Hydration of any balance of unconverted magnesium oxide from the dolime takes place during the subsequent steps. Any unhydrated magnesium oxide still remaining is normally converted to the hydroxide during the steps subsequent to precipitation, such as during filtration and creaming by, for example, sparging with steam in a stirred vessel.

Normally, the suspension of magnesium hydroxide in the calcium chloride mother liquor is discharged in an effluent overflow from the reactor, whereupon, it is transported after being degritted, if necessary, to a filtration means as, for example, a Moore-type filter or other vacuum-type filter. The degritting may be accomplished by means of passing the suspension through a cyclone-type separator, wherein clay, unburnt particles, siliceous stone and other undesirable particles are removed. The Moore filter, which is commonly known and referred to as such, comprises a series of partially evacuated fabric covered frames which are lowered into the suspension to form a cake of magnesium hydroxide on said fabric by suction. The filtrate is drawn off for subsequent recovery of the $CaCl_2$ salts. The cake thus recovered is washed using the same mechanism by drawing, for example, water through said cake to remove entrained mother liquor.

After washing, the separated product may either be mixed with enough water to reslurry it to a pumpable consistency for transporting purposes, for example, to a rotary kiln for subsequent conversion by ignition to refractory periclase, or, dried and stored for subsequent use.

The magnesium hydroxide product of the process of the present invention is suitable for use in igniting by heating to produce a high density, low porosity periclase refractory material from which high temperature resistant bricks or the like may be prepared. Example I which follows hereinafter specifically shows the high degree of purity obtainable as well as the dense nature of the crystalline product of the present invention.

The concentrated undiluted calcium chloride mother liquor after being separated from the magnesium hydroxide precipitate as by filtration may, if desired, be transported directly to evaporators and dryers for conversion into solid calcium chloride. NaCl is commonly removed (desalting) during the evaporation process. This concentrated filtrate is particularly suitable for preparing solid anhydrous calcium chloride by the method disclosed in U.S. Patent 2,646,343, wherein the concentrated calcium chloride solution is sprayed on a tumbling body of discrete calcium chloride particles to produce under heat by surface growth and agglomeration larger particles and finally lumps of anhydrous calcium chloride. Inasmuch as the filtrate is generated from the process in a highly concentrated condition, the purity and concentration being indicated in the example, the heating costs of evaporation and additional purification costs are considerably reduced compared to that required to evaporate and purify the diluted filtrate of the prior art processes.

The improved process of the present invention, then, clearly provides a means of producing readily filterable high purity periclase grade magnesium hydroxide from reactive dolime or lime and a brine containing magnesium chloride while recovering essentially all the magnesium chloride from the brine and without the attending and troublesome limitations of either pulverizing the dolime, or, using a diluted slaking solution in the slaking operation as was heretofore required, and without the need of heat exchangers in the process, while yet generating an undiluted calcium chloride effluent filtrate suitable for use in recovering solid calcium chloride therefrom.

The following examples serve to more fully illustrate the improved process and novel precipitating and slaking procedure of the present invention but are not to be construed as limiting it thereto.

EXAMPLE I

Dolomite stone received from the quarries located near Cedarville, Michigan, crushed to about ½ to 2½ inch sized particles and assaying about 1.03 moles of $CaCO_3$ to 1.0 mole of $MgCO_3$, was calcined in a rotary kiln at about 1400° C. to drive off $CO_2$ to produce dolime particles essentially of the same size and was then admixed with water in a mixer in a weight ratio of 0.78 pounds of water per pound of CaO in the dolime and at a temperature of about 100° C. to hydrate (slake) the CaO portion of said dolime to $Ca(OH)_2$ The amount of water employed was sufficient to hydrate (slake) the dolime as described and to substantially remove the heat of reaction (hydration) by vaporization as steam. During the slaking operation the dolime particles disintegrated into a powder consistency. The dolime, so-slaked, was then conveyed to a precipitator by dispersing it in a side stream of precipitator slurry, derived from the subsequent precipitation step in the process, as will be described immediately below, and running the stream into said precipitator. By simultaneous addition, both the brine and slaked dolime were introduced into about a 300,000-gallon precipitator equipped with a turbine agitator sufficient to keep the contents thereof thoroughly mixed, thereby to precipitate the magnesium values present as $Mg(OH)_2$ and to prevent settling of the solid portions of the slurry. With respect to composition, the brine comprised by weight of about 17.25 percent $CaCl_2$, about 9.48 percent $MgCl_2$, about 2.95 percent NaCl, and small amounts of other alkali and alkaline earth metal salts, the balance being water, said composition having a specific gravity of about 1.278. An average inventory time of the reactants in the precipitator was maintained at about a 14-hour level by regulating the rate of flow of the two streams of reactants entering it. A substantially constant temperature of about 51° C. was obtained in the precipitator. The rate of addition of slaked dolime to the precipitator was such that a soluble alkalinity of from about 10 to 12 mls., with an average of 10.4 mls., was maintained in the mixture so-produced in the precipitator. Under the above conditions approximately 254 tons of dolime and 506,000 gallons of brine per day were being processed. Magnesium hydroxide suspended in a mother liquor of the unprecipitated salts, having a concentration of $CaCl_2$ therein of about 25.5 percent by weight was produced.

The magnesium hydroxide suspension so-produced was separated from the mother liquor by use of a Moore-type filter, thereby producing damp filter cake at a rate of about 25,000 pounds per hour on a dry basis. A battery of filters was employed sufficient in capacity to recover about 300 tons per day of damp cake product, expressed on a dry basis. So separated, the hydroxide was washed while in cake form on the Moore-type filters by drawing water through the deposited cake and then reslurried with enough water to make a pumpable product. The cake so-obtained was then ready for treatment in a rotary drying and burning kiln for conversion into periclase. The figures in Table I below indicate the purity of the magnesium hydroxide damp cake product so obtained along with the filtering and dewatering rate.

Table I

| | |
|---|---|
| $Mg(OH)_2$ in washed cake | 53.56%. |
| CaO in solids, calcined basis | 0.77%. |
| Filter rate of slurry | 8.20 gal./hr./ft.$^2$. |
| Dewatering rate | 180 lbs./hr./ft.$^2$. |

The filtrate from the filtration step comprised concentrated aqueous calcium chloride having a specific gravity of about 1.27, containing approximately 300 p.p.m. $MgCl_2$, and was fed into a dryer and evaporator system for processing to a solid assaying approximately 95 percent $CaCl_2$ The above example clearly shows, in addition to avoiding the disadvantages of the aforesaid prior art processes, that by the novel process of the present invention a high quality periclase grade magnesium hydroxide product is produced while obtaining a concentrated calcium chloride filtrate especially adapted for economical evaporation to solid calcium chloride.

EXAMPLE II

In a manner similar to Example I, a 1.415 specific gravity effluent brine (mother liquor) containing about 27.0 percent calcium chloride and 14.8 percent magnesium chloride as generated from the carnallite process, a well-known process for recovering potassium values from brines containing potassium chloride and magnesium chloride, was processed by reaction with dolime, slaked in accordance with the present invention, at a soluble alkalinity of about 13.6 mls. A magnesium hydroxide precipitate was formed suspended in a 1.418 specific gravity liquor analyzing about 40.7 percent calcium chloride and about 600 parts per million of magnesium chloride. Subsequently, the precipitate was separated from the liquor by filtration then washed and creamed to produce a useful magnesium hydroxide product.

It is manifest that various modifications can be made in the process of the present invention without departing from the spirit or scope thereof and it is understood that we limit ourselves only as defined by the appended claims.

We claim:
1. A method of producing magnesium hydroxide and an undiluted calcium chloride liquor essentially free of magnesium chloride comprising the steps of: slaking a calcium oxide-containing material selected from the group consisting of porous particles of dolime and lime by contacting said material with only an amount of water to hydrate the CaO contained in said material and to remove at least a portion of the heat of reaction by evaporation as steam during slaking; reacting the so-slaked calcium oxide-containing material by simultaneous addition to a stirred reactor with a brine containing magnesium chloride at a rate sufficient to provide a slight excess of $Ca(OH)_2$ corresponding to a soluble alkalinity level in the reactor within the range of from about 4 to about 30 mls. thereby to precipitate essentially all the magnesium values in said brine and form a suspension of magnesium hydroxide precipitate in an undiluted aqueous calcium chloride mother liquor; separating the magnesium hydroxide precipitate from said mother liquor; and washing the so separated precipitate, thereby forming a magnesium hydroxide product and an undiluted calcium chloride liquor.

2. The method of claim 1 wherein the amount of water to hydrate the CaO in the material is within the range of from about 0.40 to 1.5 pounds water per pound of CaO.

3. The method of claim 1 wherein the amount of water to hydrate the CaO in the material is within the range of from about 0.55 to about 0.95 pound water per pound of CaO.

4. The method of claim 1 wherein the brine contains at least about 2 percent by weight magnesium chloride.

5. The method of claim 4 wherein the brine contains at least about 15 percent by weight calcium and magnesium chlorides.

6. The method of claim 1 wherein the selected porous material has been prepared previous to slaking by calcination at a temperature within the range of from about 1150° to about 1450° C.

7. A method of producing a magnesium hydroxide product, and an undiluted calcium chloride effluent liquor essentially free of residual magnesium chloride comprising the steps of: slaking a porous dolime material containing calcium oxide by contacting said material with an amount of water within the range of from about 0.4 to about 1.5 pounds per pound of calcium oxide in the dolime to hydrate said calcium oxide and to remove at least a portion of the heat of reaction by evaporation as steam during slaking; reacting the so slaked dolime by simultaneous addition to a stirred reactor with a brine containing an amount by weight of the chlorides of magnesium and calcium within the range of from about 15 to about 30 mls., thus to form a precipitator slurry comalkalinity in the reactor within the range of from about 4 to about 30 mls., thus to form a precipitate slurry comprising magnesium hydroxide precipitate in an undiluted calcium chloride mother liquor essentially free of residual magnesium chloride values, said slaked dolime being transported to said reactor in a recycle stream of said precipitator slurry; separating the magnesium hydroxide so precipitated from said liquor, followed by washing the so separated precipitate, thereby to produce a magnesium hydroxide product and an undiluted calcium chloride effluent liquor.

References Cited by the Examiner
UNITED STATES PATENTS

| | | | |
|---|---|---|---|
| 678,500 | 7/1901 | Lauman | 23—188 |
| 2,373,913 | 4/1945 | Pike | 23—201 X |
| 3,007,776 | 11/1961 | Periand | 23—201 |
| 3,080,215 | 3/1963 | Waldron et al. | 23—201 |
| 3,111,376 | 11/1963 | Patton et al. | 23—201 |
| 3,127,241 | 3/1964 | Periard et al. | 23—201 |
| 3,165,380 | 1/1965 | Warner | 23—188 |

OSCAR R. VERTIZ, *Primary Examiner.*

EDWARD STERN, *Examiner.*